United States Patent
Watatani et al.

(10) Patent No.: US 9,187,376 B2
(45) Date of Patent: Nov. 17, 2015

(54) SINTERED COMPACT, CUTTING TOOL FORMED USING SINTERED COMPACT, AND METHOD FOR MANUFACTURING SINTERED COMPACT

(71) Applicant: SUMITOMO ELECTRIC INDUSTRIES, LTD., Osaka (JP)

(72) Inventors: Kenichi Watatani, Hyogo (JP); Michiko Matsukawa, Hyogo (JP); Katsuhito Yoshida, Hyogo (JP); Daisuke Murakami, Hyogo (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 329 days.

(21) Appl. No.: 13/723,565

(22) Filed: Dec. 21, 2012

(65) Prior Publication Data

US 2014/0178138 A1  Jun. 26, 2014

(51) Int. Cl.
  B23B 27/14 (2006.01)
  C04B 35/597 (2006.01)
  C04B 35/626 (2006.01)
  C04B 35/645 (2006.01)
  B23C 5/20 (2006.01)

(52) U.S. Cl.
  CPC ......... C04B 35/597 (2013.01); C04B 35/62645 (2013.01); C04B 35/645 (2013.01); C04B 2235/3206 (2013.01); C04B 2235/3217 (2013.01); C04B 2235/3225 (2013.01); C04B 2235/3244 (2013.01); C04B 2235/3813 (2013.01); C04B 2235/3839 (2013.01); C04B 2235/3843 (2013.01); C04B 2235/3856 (2013.01); C04B 2235/3886 (2013.01); C04B 2235/402 (2013.01); C04B 2235/404 (2013.01); C04B 2235/405 (2013.01); C04B 2235/407 (2013.01); C04B 2235/5445 (2013.01); C04B 2235/5454 (2013.01); C04B 2235/766 (2013.01); C04B 2235/767 (2013.01); C04B 2235/80 (2013.01); Y10T 407/27 (2015.01)

(58) Field of Classification Search
  CPC  C04B 35/597; C04B 35/593; C04B 2235/96; B23B 27/14; B23C 2228/49
  USPC .......................................... 407/119; 82/1.11
  See application file for complete search history.

(56) References Cited

U.S. PATENT DOCUMENTS

| | | | | |
|---|---|---|---|---|
| 4,243,621 | A | * | 1/1981 | Mori et al. ..................... 264/647 |
| 4,280,973 | A | * | 7/1981 | Moskowitz et al. .......... 264/668 |
| 4,626,451 | A | * | 12/1986 | Tanaka et al. ................. 427/123 |
| 4,818,635 | A | * | 4/1989 | Ekstrom et al. ............... 428/698 |

(Continued)

FOREIGN PATENT DOCUMENTS

| | | |
|---|---|---|
| JP | 2849055 B2 | 11/1998 |
| JP | 2005-212048 A | 8/2005 |
| JP | 2011-121821 A | 6/2011 |

(Continued)

*Primary Examiner* — Will Fridie, Jr.
(74) *Attorney, Agent, or Firm* — Ditthavong & Steiner, P.C.

(57) ABSTRACT

A sintered compact contains cubic sialon, β-sialon, and at least one of a first component and a second component. The first component is at least one element selected from the group consisting of iron, cobalt, nickel, and group 4 elements, group 5 elements, and group 6 elements of the periodic table. The second component is at least one compound containing at least one element selected from the group consisting of group 4 elements, group 5 elements, and group 6 elements and at least one element selected from the group consisting of carbon, nitrogen, and boron.

10 Claims, 1 Drawing Sheet

(56) References Cited

U.S. PATENT DOCUMENTS

| | | | | |
|---|---|---|---|---|
| 5,204,297 | A | * | 4/1993 | Yamamoto et al. .......... 501/97.3 |
| 6,001,759 | A | * | 12/1999 | Miyanaga et al. .......... 501/97.2 |
| 6,471,734 | B1 | * | 10/2002 | Yeckley ......................... 51/307 |
| 2007/0010392 | A1 | * | 1/2007 | Bitterlich et al. ............ 501/98.3 |
| 2009/0300992 | A1 | * | 12/2009 | Bitterlich et al. ............... 51/309 |

FOREIGN PATENT DOCUMENTS

| | | |
|---|---|---|
| JP | 2011-121822 A | 6/2011 |
| JP | 2011-140414 A | 7/2011 |
| JP | 2011-140415 A | 7/2011 |
| JP | 2011-157233 A | 8/2011 |
| JP | 2011-256067 A | 12/2011 |

\* cited by examiner

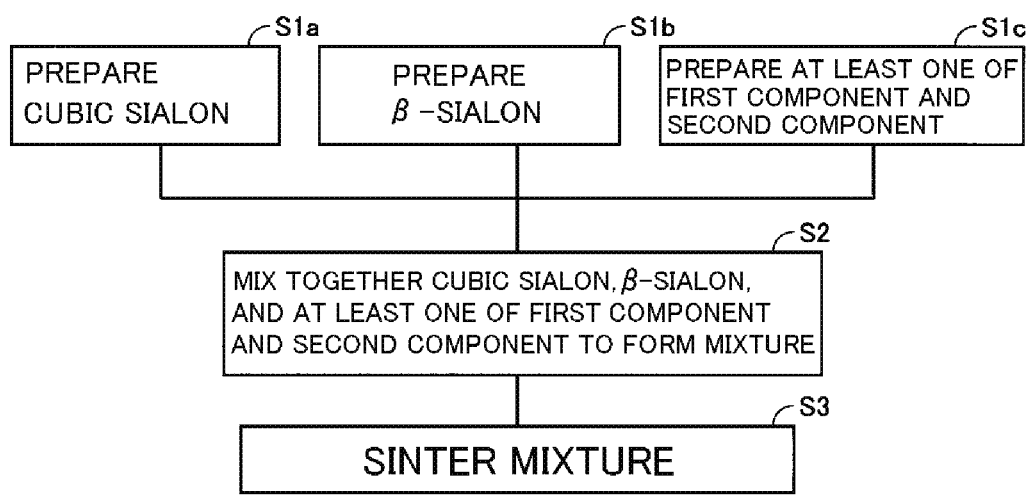

SINTERED COMPACT, CUTTING TOOL FORMED USING SINTERED COMPACT, AND METHOD FOR MANUFACTURING SINTERED COMPACT

BACKGROUND OF THE INVENTION

1. Field of the Invention

The present invention relates to sintered compacts, cutting tools formed using sintered compacts, and methods for manufacturing sintered compacts, and more particularly to sintered compacts containing cubic boron nitride, cutting tools formed using such sintered compacts, and methods for manufacturing such sintered compacts.

2. Description of the Related Art

Sialon (also written as "SiAlON") is silicon nitride having aluminum and oxygen dissolved therein and takes two types of crystal forms, namely, α-type and β-type, which belong to the hexagonal system (hereinafter referred to as "α-sialon" and "β-sialon"). Sintered compacts containing sialon have been studied as a cutting tool material for their low reactivity with workpieces.

For example, Japanese Patent No. 2849055 discloses a sialon-based sintered compact based on α-sialon and/or β-sialon, with the balance including a composite oxide of a rare earth element, a group 4 element, and at least one of group 2, 6, 7, and 8 elements.

Japanese Unexamined Patent Application Publication No. 2005-212048 discloses a ceramic containing $Si_3N_4$ or sialon particles bound together with a metal and/or an alloy in an amorphous phase.

The above sialon ceramics have low reactivity with workpieces, although they have a lower hardness than cubic boron nitride and exhibit insufficient wear resistance when used as a cutting tool material.

In view of hardness and reactivity with workpieces, therefore, there is a need for a sintered compact that can be used as a cutting tool material to form a cutting tool having both superior wear resistance and superior fracture resistance.

SUMMARY OF THE INVENTION

It is an object of the present invention to provide a sintered compact that can be used as a cutting tool material to form a cutting tool with superior wear resistance and fracture resistance, a method for manufacturing such a sintered compact, and a cutting tool formed using such a sintered compact.

A sintered compact according to a first aspect of the present invention contains cubic sialon, β-sialon, and at least one of a first component and a second component. The first component is at least one element selected from the group consisting of iron, cobalt, nickel, and group 4 elements, group 5 elements, and group 6 elements of the periodic table. The second component is at least one compound containing at least one element selected from the group consisting of group 4 elements, group 5 elements, and group 6 elements and at least one element selected from the group consisting of carbon, nitrogen, and boron.

A method for manufacturing a sintered compact according to a second aspect of the present invention includes the following steps: preparing cubic sialon; preparing β-sialon; preparing at least one of a first component and a second component; mixing together the cubic sialon, the β-sialon, and the at least one of the first component and the second component to form a mixture; and sintering the mixture. The cubic sialon is obtained by subjecting β-sialon to shock compression. The first component is at least one element selected from the group consisting of iron, cobalt, nickel, and group 4 elements, group 5 elements, and group 6 elements of the periodic table. The second component is at least one compound containing at least one element selected from the group consisting of group 4 elements, group 5 elements, and group 6 elements and at least one element selected from the group consisting of carbon, nitrogen, and boron.

The inventors have conducted an intensive study in light of the above problem and have found that a cutting tool formed using a sintered compact containing cubic sialon, β-sialon, and at least one of the first component and the second component, as described above, has superior wear resistance and fracture resistance. This is because the sintered compact has high hardness, low reactivity with workpieces, and a good balance of hardness and toughness. The high hardness is attributed to the fact that the sintered compact contains cubic sialon, which has a higher hardness than α-sialon and β-sialon. The low reactivity with workpieces is attributed to the fact that the sintered compact contains a sialon having low reactivity with workpieces. The good balance of hardness and toughness is attributed to the fact that the sintered compact contains both cubic sialon and β-sialon and further contains at least one of the first component and the second component, which increase the binding force between sialon particles.

In the sintered compact according to the first aspect and the method for manufacturing a sintered compact according to the second aspect, the mass γ of the cubic sialon and the mass α of the β-sialon in the sintered compact or the mixture are preferably represented by Inequality 1:

$$0.2 \leq \gamma/(\gamma+\alpha) \leq 0.8 \qquad (1)$$

The above sintered compact and a sintered compact manufactured by the above method for manufacturing a sintered compact can be used to form a cutting tool with superior wear resistance and fracture resistance. These sintered compacts, containing cubic sialon and β-sialon in the above proportions, have a good balance of improved hardness and toughness. This characteristic of the sintered compacts improves the wear resistance and fracture resistance of a cutting tool.

In the sintered compact according to the first aspect, the total content of the first and second components in the sintered compact is preferably 0.05% to 5% by mass.

In the method for manufacturing a sintered compact according to the second aspect, the total content of the first and second components in the mixture is preferably 0.05% to 5% by mass.

The above sintered compact and a sintered compact manufactured by the above method for manufacturing a sintered compact can be used to form a cutting tool with superior fracture resistance. The first and second components increase the binding force between cubic sialon particles, between β-sialon particles, and between cubic sialon particles and β-sialon particles in the sintered compacts, thus improving the toughness of the sintered compacts. These sintered compacts, containing the first and second components in the above proportion, have a good balance of improved hardness and toughness. This characteristic of the sintered compacts improves the wear resistance and fracture resistance of a cutting tool.

The sintered compact according to the first aspect preferably further contains a third component. The third component is at least one compound containing at least one element selected from the group consisting of oxygen, nitrogen, and boron; and at least one element selected from the group consisting of silicon, magnesium, aluminum, zirconium, and group 3 elements.

In the method for manufacturing a sintered compact according to the second aspect, a third component is preferably further mixed in the step of forming the mixture. The third component is at least one compound containing at least one element selected from the group consisting of oxygen, nitrogen, and boron; and at least one element selected from the group consisting of silicon, magnesium, aluminum, zirconium, and group 3 elements.

The above sintered compact and a sintered compact manufactured by the above method for manufacturing a sintered compact can be used to form a cutting tool with superior fracture resistance. The third component increases the binding force between cubic sialon particles, between β-sialon particles, and between cubic sialon particles and β-sialon particles in the sintered compacts, thus improving the toughness of the sintered compacts. This characteristic of the sintered compacts improves the fracture resistance of a cutting tool.

A cutting tool according to a third aspect of the present invention is formed of the sintered compact according to the first aspect. The cutting tool, formed using the sintered compact according to the first aspect, has superior wear resistance and fracture resistance.

A sintered compact according to a fourth aspect of the present invention is manufactured by the method for manufacturing a sintered compact according to the second aspect. The sintered compact thus manufactured can be used to form a cutting tool with superior wear resistance and fracture resistance.

BRIEF DESCRIPTION OF THE DRAWINGS

FIGURE is a flowchart of a method for manufacturing a sintered compact according to an embodiment of the present invention.

DESCRIPTION OF THE PREFERRED EMBODIMENTS

First Embodiment: Sintered Compact

In an embodiment of the present invention, a sintered compact contains cubic sialon, β-sialon, and at least one of a first component and a second component.

Cubic sialon is silicon nitride having aluminum and oxygen dissolved therein and having a cubic crystal structure. Cubic sialon has a higher hardness than α-sialon and β-sialon. This allows a sintered compact containing cubic sialon to have high hardness while maintaining its low reactivity, which is characteristic of sialon.

The content of cubic sialon is preferably 20% to 80% by mass based on 100% by mass of the sintered compact. If the content of cubic sialon falls below 20% by mass, it provides insufficient hardness for the sintered compact. If the content of cubic sialon exceeds 80% by mass, the sintered compact has high hardness, although it has low fracture resistance.

β-Sialon has low reactivity with workpieces. A sintered compact containing β-sialon can be used as a cutting tool material to form a cutting tool with superior wear resistance.

The sintered compact, containing cubic sialon and β-sialon, has a good balance of improved hardness and toughness. If the sintered compact contains cubic sialon but not β-sialon, it has low toughness. If the sintered compact contains β-sialon but not cubic sialon, it has insufficient hardness.

The mass γ of cubic sialon and the mass α of β-sialon in the sintered compact are preferably represented by Inequality 1:

$$0.2 \leq \gamma/(\gamma+\alpha) \leq 0.8 \quad (1)$$

If the mass γ of cubic sialon and the mass α of β-sialon in the sintered compact satisfy Inequality 1, the resulting sintered compact has superior hardness and toughness.

More preferably, the mass γ of cubic sialon and the mass α of β-sialon are represented by Inequality 2:

$$0.5 \leq \gamma/(\gamma+\alpha) \leq 0.8 \quad (2)$$

The total content of cubic sialon and β-sialon is preferably 95% to 99.95% by mass based on 100% by mass of the sintered compact. If the total content of cubic sialon and β-sialon falls within the above range, the sintered compact has low reactivity with workpieces.

The first component is at least one element selected from the group consisting of iron, cobalt, nickel, and group 4 elements, group 5 elements, and group 6 elements of the periodic table. The first component increases the binding force between cubic sialon particles, between β-sialon particles, and between cubic sialon particles and β-sialon particles in the sintered compact, thus improving the toughness of the sintered compact. This characteristic of the sintered compact improves the fracture resistance of a cutting tool.

Preferred examples of first components include iron, nickel, cobalt, titanium, zirconium, vanadium, niobium, tantalum, chromium, molybdenum, tungsten, and hafnium. These first components may be used alone or in combination.

The second component is at least one compound (including a solid solution thereof) containing at least one element selected from the group consisting of group 4 elements, group 5 elements, and group 6 elements and at least one element selected from the group consisting of carbon, nitrogen, and boron. The second component increases the binding force between cubic sialon particles, between β-sialon particles, and between cubic sialon particles and β-sialon particles in the sintered compact, thus improving the toughness of the sintered compact. This characteristic of the sintered compact improves the fracture resistance of a cutting tool.

The second component is preferably at least one compound selected from the group consisting of carbides, nitrides, carbonitrides, and borides of at least one element selected from the group consisting of group 4 elements, group 5 elements, and group 6 elements. Preferred examples of second components include TiN, TiC, TiCN, $TiB_2$, ZrN, ZrC, $ZrB_2$, VN, VC, and WC. These second components may be used alone or in combination.

The total content of the first and second components in the sintered compact is preferably 0.05% to 5% by mass. If the sintered compact contains only the first component and not the second component, the content of the first component is preferably 0.05% to 5% by mass. If the sintered compact contains only the second component and not the first component, th.e content of the second component is preferably 0.05% to 5% by mass, If the sintered compact contains both the first component and the second component, the total content thereof is preferably 0.05% to 5% by mass.

Second Embodiment: Sintered Compact

In an embodiment of the present invention, a sintered compact contains cubic sialon, β-sialon, at least one of a first component and a second component, and a third component.

The cubic sialon, the β-sialon, and the first and second components used may be the same as those of the first embodiment. The third component is at least one compound (including a solid solution thereof) containing oxygen and at least one element selected from the group consisting of silicon, magnesium, aluminum, zirconium, and group 3 elements. The third component functions to bind cubic sialon particles together, to bind β-sialon particles together, or to bind cubic sialon particles and β-sialon particles together in the sintered compact. The sintered compact, containing the third component, has improved binding force between the particles, thus exhibiting superior toughness.

Preferably, the third component is an oxide, a nitride, or a boride of at least one element selected from the group consisting of silicon, magnesium, aluminum, zirconium, and group 3 elements. Preferred examples of third components include an oxide such as $Al_2O_3$, $Y_2O_3$, $ZrO_2$, and MgO; a nitride such as $Ti_2AlN$, AlN, ZrN; or a boride such as $AlB_2$ or $ZrB_2$. These third components may be used alone or in combination.

Third Embodiment: Method for Manufacturing Sintered Compact

A method for manufacturing a sintered compact according to an embodiment of the present invention will now be described with reference to FIGURE. This method includes preparing cubic sialon (S1a); preparing β-sialon (S1b); preparing at least one of a first component and a second component (S1c); mixing together the cubic sialon, the β-sialon, and at least one of the first component and the second component to form a mixture (S2); and sintering the mixture (S3).

Step of Preparing Cubic Sialon (S1a)

Cubic sialon is prepared (S1a). The cubic sialon is obtained by, for example, subjecting β-sialon to shock compression. In this case, the β-sialon preferably has an average particle size of 0.1 to 10 μm.

The shock compression is preferably performed in an atmosphere at 2,000° C. to 4,000° C. and 40 to 50 GPa. Processing β-sialon under these conditions converts 30% to 50% of it to cubic sialon.

The cubic sialon obtained by shock compression is preferably purified. After β-sialon is subjected to shock compression, as described above, some of it remains without being converted into cubic sialon. The powder subjected to shock compression contains β-sialon and a slight amount of amorphous component as well as cubic sialon. The cubic sialon can be purified from the processed powder to obtain a powder having a high content of cubic sialon.

The cubic sialon can be purified by, for example, the following method. First, the powder subjected to shock compression is cleaned with an acidic solution such as hydrofluoric acid. The amorphous component, which is soluble in an acidic solution, can be removed by cleaning the powder with an acidic solution. The cubic sialon contained in the cleaned powder is then separated from β-sialon based on their difference in specific gravity. The cubic sialon can be purified by centrifugation because cubic sialon and β-sialon have different densities, namely, 4.0 g/cm³ and 3.14 g/cm³, respectively. The resulting cubic sialon has an average particle size of about 0.01 to 5 μm.

Step of Preparing β-Sialon (S1b)

β-Sialon is prepared (S1b). The β-sialon may be a commercially available product. Alternatively, the β-sialon may be the β-sialon remaining without being converted into cubic sialon after shock compression in the step of preparing the cubic sialon. The β-sialon preferably has an average particle size of 0.01 to 0.5 μm.

Step of Preparing at Least One of First Component and Second Component (S1c)

At least one of a first component and a second component is prepared (S1c).

The first component is at least one element selected from the group consisting of iron, cobalt, nickel, and group 4 elements, group 5 elements, and group 6 elements of the periodic table. The first component increases the binding three between cubic sialon particles, between β-sialon particles, and between cubic sialon particles and β-sialon particles in the sintered compact, thus improving the toughness of the sintered compact. This characteristic of the sintered compact improves the fracture resistance of a cutting tool.

Preferred examples of first components include iron, nickel, cobalt, titanium, zirconium, vanadium, niobium, tantalum, chromium, molybdenum, tungsten, and hafnium. These first components may be used alone or in combination.

The second component is at least one compound (including a solid solution thereof) containing at least one element selected from the group consisting of group 4 elements, group 5 elements, and group 6 elements and at least one element selected from the group consisting of carbon, nitrogen, and boron. The second component increases the binding force between cubic sialon particles, between β-sialon particles, and between cubic sialon particles and β-sialon particles in the sintered compact, thus improving the toughness of the sintered compact. This characteristic of the sintered compact improves the fracture resistance of a cutting tool.

The second component is preferably at least one compound selected from the group consisting of carbides, nitrides, carbonitrides, and borides of at least one element selected from the group consisting of group 4 elements, group S elements, and group 6 elements. Preferred examples of second components include TiN, TiC, TiCN, $TiB_2$, ZrN, ZrC, $ZrB_2$, VN, VC, and WC. These second components may be used alone or in combination.

Step of Preparing Mixture (S2)

The cubic sialon, the β-sialon, and at least one of the first component and the second component are then mixed together to form a mixture (S2).

The mass γ of the cubic sialon and the mass α of the β-sialon in the mixture are preferably represented by Inequality 1:

$$0.2 \leq \gamma/(\gamma+\alpha) \leq 0.8 \quad (1)$$

If the mass γ of the cubic sialon and the mass α of the β-sialon in the mixture satisfy Inequality 1, the resulting sintered compact can be used to form a cutting tool with superior wear resistance and fracture resistance.

More preferably, the mass γ of the cubic sialon and the mass α of the β-sialon are represented by Inequality 2:

$$0.5 \leq \gamma/(\gamma+\alpha) \leq 0.8 \quad (2)$$

The total content of the cubic sialon and the β-sialon in the mixture is preferably 95% to 99.95% by mass based on 100% by mass of the mixture. If the total content of the cubic sialon and the β-sialon in the mixture falls within the above range, the resulting sintered compact has low reactivity with workpieces.

The total content of the first and second components in the mixture is preferably 0.05% to 5% by mass. If the mixture contains only the first component and not the second component, the content of the first component is preferably 0.05% to 5% by mass. If the mixture contains only the second component and not the first component, the content of the seeon.d component is preferably 0.05% to 5% by mass. If the mixture contains both the first component and the second component, the total content thereof is preferably 0.05% to 5% by mass.

The mixture can be formed by, for example, sonicating the cubic sialon, the β-sialon, and at least one of the first component and the second component in an organic solvent such as ethanol in advance, or mixing them in a ball mill, and then drying the resulting slurry using, for example, a dryer.

In the step of mixing together the cubic sialon, the β-sialon, and at least one of the first component and the second component (S2), a third component is preferably further mixed.

The third component is at least one compound (including a solid solution thereof) containing at least one element selected from the group consisting of oxygen, nitrogen, and boron; and at least one element selected from the group consisting of silicon, magnesium, aluminum, zirconium, and group 3 elements. The third component functions to bind cubic sialon particles together, to bind β-sialon particles together, or to bind cubic sialon particles and β-sialon particles together in the sintered compact. A sintered compact formed using the mixture containing the third component has improved binding force between the particles, thus exhibiting superior toughness.

Preferably, the third component is an oxide, a nitride, or a boride of at least one element selected from the group consisting of silicon, magnesium, aluminum, zirconium, and group 3 elements. Preferred examples of third components include an oxide such as $Al_2O_3$, $Y_2O_3$, $ZrO_2$, and MgO; a nitride such as $Ti_2AlN$, AlN, ZrN; or a boride such as $AlB_2$ or $ZrB_2$. These third components may be used alone or in combination.

Step of Sintering Mixture (S3)

The mixture is then sintered to form a sintered compact (S3).

The mixture can be sintered after compaction molding. Alternatively, compaction molding and sintering can be simultaneously performed.

For example, as in hot pressing, simultaneously performing sintering and compaction molding promotes sintering. The molding pressure is preferably 1 to 50 MPa, more preferably 10 to 30 MPa. The sintering temperature is preferably 1,400° C. to 2,000° C., more preferably 1,400° C. to 1,600° C.

Alternatively, the mixture may be molded by cold isostatic pressing (CIP) and then be sintered by hot isostatic pressing (HIP). This also promotes sintering.

Fourth Embodiment: Cutting Tool

In an embodiment of the present invention, the above sintered compact can be used for indexable cutting tools for applications such as turning and milling (e.g., end milling) of refractory alloys.

EXAMPLES

Examples 1 to 66 and Comparative Examples 1 to 3

Preparation of Cubic Sialon

A stainless steel container was charged with 300 g of β-sialon particles and was subjected to shock compression at about 40 GPa and 2,000° C. to 2,500° C. by explosion of an explosive. After shock compression, the stainless steel container was dissolved in nitric acid to obtain a powder. X-ray diffraction analysis showed that the resulting powder contained cubic sialon, β-sialon, and an amorphous component.

The resulting powder was cleaned with a hydrofluoric acid solution to remove the amorphous component and was then pulverized to a particle size of about 0.05 to 0.2 μm using a pulverizer. The pulverized powder was subjected to centrifugation to separate cubic sialon particles from β-sialon particles. As a result, 128 g of cubic sialon particles 1.5 were yielded.

Production of Sintered Compact

Cubic sialon particles, β-sialon particles, first component particles, second component particles, and third component particles were mixed according to the compositions shown in Table I, and the resulting mixtures were placed in a ceramic ball mill. For the examples where two types of first components were used, the "Type (mass ratio)" subcolumn of the "First component" column in Table lists the types and mass ratio of the first components, and the "Content" subcolumn lists the total content of the two types of first components.

Ceramic balls and 100 ml of ethanol were then added to the ball mill, and the mixture was subjected to ball milling for two hours.

After ball milling, the slurred mixture was placed in a dryer held at 100° C. to evaporate ethanol, thus yielding a mixed powder of cubic sialon particles, β-sialon particles, and at least one of first component particles and second component particles.

Next, 4 g of the mixed powder was sintered at 1,500° C. for 30 minutes while applying a pressure of 5 GPa using an ultrahigh-pressure press.

X-ray diffraction analysis of the mixed powder and the resulting sintered compact showed that the mass ratio of cubic sialon to β-sialon was nearly the same before and after sintering. In addition, analysis using an electron probe X-ray microanalyzer (EPMA: a device capable of detecting characteristic X-rays occurring upon irradiation of a sample with an electron beam to determine the presence or absence and amounts of elements contained) supplied with a scanning electron microscope showed that the mixed powder and the resulting sintered compact had similar elemental compositions, that is, the elemental composition was nearly the same before and after sintering.

Performance Evaluation 1

The resulting sintered compacts were processed into a cutting tool shape designated as the ISO code SNGN120408 and were evaluated for the width of wear Vb of the cutting edge for a cutting distance of 200 m by a cutting test under the following conditions:

Workpiece: nickel-based refractory alloy (Inconel® 718 from Special Metals Corporation)

Cutting speed: 350 m/mm

Depth of cut: 0.3 mm

Feed: 0.15 mm/rev

Process: wet

The results are shown in Table I.

TABLE I

| | | Cubic sialon (g) | β-Sialon (g) | First component | | Second component | | Third component | | $\gamma/(\gamma + \alpha)$ | Evaluation results Width of wear Vb (μm) |
|---|---|---|---|---|---|---|---|---|---|---|---|
| | | | | Type (mass ratio) | Content (g) | Type (mass ratio) | Content (g) | Type (mass ratio) | Content (g) | | |
| Ex. | 1 | 8 | 2 | Fe | 0.1 | — | — | — | — | 0.8 | 53 |
| | 2 | 5 | 5 | Fe | 0.15 | — | — | — | — | 0.5 | 85 |
| | 3 | 2 | 8 | Fe | 0.2 | — | — | — | — | 0.2 | 189 |
| | 4 | 8 | 2 | Ni | 0.25 | — | — | — | — | 0.8 | 55 |
| | 5 | 5 | 5 | Ni | 0.3 | — | — | — | — | 0.5 | 84 |
| | 6 | 2 | 8 | Ni | 0.35 | — | — | — | — | 0.2 | 194 |

TABLE I-continued

|  |  | Composition | | | | | | | | Evaluation results |
|---|---|---|---|---|---|---|---|---|---|---|
|  |  | Cubic sialon (g) | β-Sialon (g) | First component | | Second component | | Third component | | |
|  |  |  |  | Type (mass ratio) | Content (g) | Type (mass ratio) | Content (g) | Type (mass ratio) | Content (g) | γ/(γ + α) | Width of wear Vb (μm) |
|  | 7 | 8 | 2 | Co | 0.1 | — | — | — | — | 0.8 | 51 |
|  | 8 | 5 | 5 | Co | 0.15 | — | — | — | — | 0.5 | 78 |
|  | 9 | 2 | 8 | Co | 0.2 | — | — | — | — | 0.2 | 180 |
|  | 10 | 8 | 2 | Ti | 0.15 | — | — | — | — | 0.8 | 53 |
|  | 11 | 5 | 5 | Ti | 0.2 | — | — | — | — | 0.5 | 78 |
|  | 12 | 2 | 8 | Ti | 0.35 | — | — | — | — | 0.2 | 180 |
|  | 13 | 8 | 2 | Zr | 0.1 | — | — | — | — | 0.8 | 48 |
|  | 14 | 5 | 5 | Zr | 0.25 | — | — | — | — | 0.5 | 74 |
|  | 15 | 2 | 8 | Zr | 0.3 | — | — | — | — | 0.2 | 176 |
|  | 16 | 8 | 2 | V | 0.15 | — | — | — | — | 0.8 | 51 |
|  | 17 | 5 | 5 | V | 0.2 | — | — | — | — | 0.5 | 76 |
|  | 18 | 2 | 8 | V | 0.35 | — | — | — | — | 0.2 | 189 |
|  | 19 | 8 | 2 | Nb | 0.1 | — | — | — | — | 0.8 | 53 |
|  | 20 | 5 | 5 | Nb | 0.25 | — | — | — | — | 0.5 | 82 |
|  | 21 | 2 | 8 | Nb | 0.35 | — | — | — | — | 0.2 | 189 |
|  | 22 | 8 | 2 | Ta | 0.2 | — | — | — | — | 0.8 | 58 |
|  | 23 | 5 | 5 | Ta | 0.3 | — | — | — | — | 0.5 | 86 |
|  | 24 | 2 | 8 | Ta | 0.45 | — | — | — | — | 0.2 | 220 |
|  | 25 | 8 | 2 | Cr | 0.1 | — | — | — | — | 0.8 | 52 |
|  | 26 | 5 | 5 | Cr | 0.25 | — | — | — | — | 0.5 | 82 |
|  | 27 | 2 | 8 | Cr | 0.4 | — | — | — | — | 0.2 | 211 |
|  | 28 | 8 | 2 | Mo | 0.1 | — | — | — | — | 0.8 | 58 |
|  | 29 | 5 | 5 | Mo | 0.2 | — | — | — | — | 0.5 | 90 |
|  | 30 | 2 | 8 | Mo | 0.3 | — | — | — | — | 0.2 | 212 |
|  | 31 | 8 | 2 | W | 0.1 | — | — | — | — | 0.8 | 47 |
|  | 32 | 5 | 5 | W | 0.2 | — | — | — | — | 0.5 | 76 |
|  | 33 | 2 | 8 | W | 0.5 | — | — | — | — | 0.2 | 234 |
|  | 34 | 8 | 2 | Hf | 0.3 | — | — | — | — | 0.8 | 83 |
|  | 35 | 5 | 5 | Hf | 0.4 | — | — | — | — | 0.5 | 122 |
|  | 36 | 2 | 8 | Hf | 0.5 | — | — | — | — | 0.2 | 270 |
|  | 37 | 8 | 2 | Fe/Cu(1/1) | 0.02 | TiN | 0.1 | — | — | 0.8 | 56 |
|  | 38 | 5 | 5 | Fe/Cu(1/1) | 0.2 | TiN | 0.1 | — | — | 0.5 | 78 |
|  | 39 | 2 | 8 | Fe/Cu(1/1) | 0.5 | TiN | 0.1 | — | — | 0.2 | 232 |
|  | 40 | 8 | 2 | Ti/Zr(1/1) | 0.1 | — | — | — | — | 0.8 | 53 |
|  | 41 | 8 | 2 | Ti/Co(2/1) | 0.2 | — | — | — | — | 0.8 | 61 |
|  | 42 | 8 | 2 | Ti/W(1/2) | 0.3 | — | — | — | — | 0.8 | 73 |
|  | 43 | 8 | 2 | Ti/Ni(1/1.5) | 0.15 | — | — | — | — | 0.8 | 57 |
|  | 44 | 8 | 2 | Ti/Cr(1.5/1) | 0.25 | — | — | — | — | 0.8 | 68 |
|  | 45 | 8 | 2 | Ti/V(1/2) | 0.35 | — | — | — | — | 0.8 | 83 |
|  | 46 | 8 | 2 | — | — | TiN | 0.1 | — | — | 0.8 | 48 |
|  | 47 | 8 | 2 | — | — | TiC | 0.2 | — | — | 0.8 | 53 |
|  | 48 | 8 | 2 | — | — | TiCN | 0.3 | — | — | 0.8 | 61 |
|  | 49 | 8 | 2 | — | — | TiB2 | 0.5 | — | — | 0.8 | 73 |
|  | 50 | 8 | 2 | — | — | ZrN | 0.1 | — | — | 0.8 | 50 |
|  | 51 | 8 | 2 | — | — | ZrC | 0.3 | — | — | 0.8 | 64 |
|  | 52 | 8 | 2 | — | — | — | — | ZrO2 | 0.2 | 0.8 | 51 |
|  | 53 | 8 | 2 | — | — | ZrB2 | 0.5 | — | — | 0.8 | 75 |
|  | 54 | 8 | 2 | — | — | VN | 0.1 | — | — | 0.8 | 55 |
|  | 55 | 8 | 2 | — | — | VC | 0.2 | — | — | 0.8 | 68 |
|  | 56 | 8 | 2 | — | — | WC | 0.5 | — | — | 0.8 | 71 |
|  | 57 | 8 | 2 | — | — | — | — | AlB2 | 0.1 | 0.8 | 58 |
|  | 58 | 8 | 2 | — | — | — | — | AlB2 | 0.5 | 0.8 | 89 |
|  | 59 | 8 | 2 | — | — | — | — | AlB12 | 0.1 | 0.8 | 70 |
|  | 60 | 8 | 2 | — | — | — | — | AlB12 | 0.5 | 0.8 | 95 |
|  | 61 | 8 | 2 | — | — | — | — | AlN | 0.1 | 0.8 | 65 |
|  | 62 | 8 | 2 | — | — | — | — | AlN | 0.5 | 0.8 | 98 |
|  | 63 | 8 | 2 | — | — | — | — | Ti2AlN | 0.1 | 0.8 | 60 |
|  | 64 | 8 | 2 | — | — | — | — | Ti2AlN | 0.5 | 0.8 | 80 |
|  | 65 | 8 | 2 | — | — | — | — | MgB2 | 0.1 | 0.8 | 90 |
|  | 66 | 8 | 2 | — | — | — | — | MgB2 | 0.5 | 0.8 | 120 |
| Comp. Ex. | 1 | 10 | 0 | Fe | 0.1 | — | — | — | — | 1 | Slightly fractured |
|  | 2 | 10 | 0 | Ni | 0.2 | — | — | — | — | 1 | Fractured |
|  | 3 | 10 | 0 | Co | 0.5 | — | — | — | — | 1 | Seriously fractured |

Evaluation Results 1

Examples 1 to 45 were cutting tools formed of the sintered compacts produced from the mixtures containing cubic sialon, β-sialon, and a first component. None of Examples 1 to 45 was fractured, and they had a higher fracture resistance and wear resistance than Comparative Examples 1 to 3, which contained no β-sialon. A comparison between the examples where the same first component was used shows that those where the value of γ/(γ+α) was higher had a higher wear resistance.

Examples 46 to 56 were cutting tools formed of the sintered compacts produced from the mixtures containing cubic sialon, β-sialon, and a second component. None of Examples 46 to 56 was fractured, and they had a higher fracture resistance and wear resistance than Comparative Examples 1 to 3, which contained no β-sialon.

Comparative Examples 1 to 3 were cutting tools formed of the sintered compacts produced from the mixtures containing cubic sialon and a first component. All of these comparative examples were fractured.

Examples 67 to 133 and Comparative Examples 4 to 7

Preparation of Cubic Sialon

Cubic sialon particles were prepared by the same method as in Example 1.

Production of Sintered Compact

Mixed powders were prepared according to the compositions shown in Table II. The "Type (mass ratio)" subcolumns of the "First and second components" column and the "First and third components" column list the types and mass ratio of two types of components, and the "Content" subcolumns list the total content of two types of components.

Next, 4 g of each mixed powder was sintered at 1,800° C. for one hour while applying a pressure of 30 GPa using a hot press.

X-ray diffraction analysis of the mixed powder and the resulting sintered compact showed that the mass ratio of cubic sialon to β-sialon was nearly the same before and after sintering. In addition, analysis using an EPMA supplied with a scanning electron microscope showed that the mixed powder and the resulting sintered compact had similar elemental compositions, that is, the elemental composition was nearly the same before and after sintering.

Performance Evaluation 2

The resulting sintered compacts were processed into a cutting tool shape designated as the ISO code SNGN120408 and were evaluated for the width of wear VII of the cutting edge for a cutting distance of 200 m by a cutting test under the following conditions:

Workpiece: nickel-based refractory alloy (Inconel® 718 from Special Metals Corporation)
Cutting speed: 350 m/min
Depth of cut: 0.3 mm
Feed: 0.15 mm/rev
Process: wet The results are shown in Table II.

TABLE II

| | | Cubic sialon (g) | β-Sialon (g) | First and second components Type (mass ratio) | First and second components Content (g) | First and third components Type (mass ratio) | First and third components Content (g) | $\gamma/(\gamma + \alpha)$ | Width of wear Vb (μm) |
|---|---|---|---|---|---|---|---|---|---|
| Ex. | 67 | 8 | 2 | — | — | Co/Al$_2$O$_3$(3/1) | 0.1 | 0.8 | 72 |
| | 68 | 8 | 2 | — | — | Co/Y$_2$O$_3$(4/1) | 0.25 | 0.8 | 88 |
| | 69 | 8 | 2 | — | — | Co/ZrO$_2$(5/1) | 0.3 | 0.8 | 98 |
| | 70 | 8 | 2 | — | — | Co/MgO(2/1) | 0.5 | 0.8 | 149 |
| | 71 | 8 | 2 | Co/TiN(3/1) | 0.2 | — | — | 0.8 | 94 |
| | 72 | 8 | 2 | Co/TiC(4/1) | 0.1 | — | — | 0.8 | 77 |
| | 73 | 8 | 2 | Co/TiCN(2/1) | 0.25 | — | — | 0.8 | 99 |
| | 74 | 8 | 2 | Co/TiB$_2$(1/1) | 0.3 | — | — | 0.8 | 93 |
| | 75 | 8 | 2 | Co/ZrN(3/1) | 0.2 | — | — | 0.8 | 94 |
| | 76 | 8 | 2 | Co/ZrC(4/1) | 0.5 | — | — | 0.8 | 149 |
| | 77 | 8 | 2 | Co/ZrB$_2$(5/1) | 0.4 | — | — | 0.8 | 116 |
| | 78 | 8 | 2 | — | — | Ti/Al$_2$O$_3$(2/1) | 0.1 | 0.8 | 77 |
| | 79 | 8 | 2 | — | — | Ti/Y$_2$O$_3$(3/1) | 0.2 | 0.8 | 94 |
| | 80 | 8 | 2 | — | — | Ti/ZrO$_2$(4/1) | 0.25 | 0.8 | 105 |
| | 81 | 8 | 2 | — | — | Ti/MgO(5/1) | 0.3 | 0.8 | 115 |
| | 82 | 8 | 2 | Ti/TiN(2/1) | 0.5 | — | — | 0.8 | 138 |
| | 83 | 8 | 2 | Ti/TiC(3/1) | 0.2 | — | — | 0.8 | 94 |
| | 84 | 8 | 2 | Ti/TiCN(2/1) | 0.3 | — | — | 0.8 | 110 |
| | 85 | 8 | 2 | Ti/TiB2(4/1) | 0.35 | — | — | 0.8 | 105 |
| | 86 | 8 | 2 | Ti/ZrN(2/1) | 0.4 | — | — | 0.8 | 127 |
| | 87 | 8 | 2 | Ti/ZrC(3/1) | 0.45 | — | — | 0.8 | 138 |
| | 88 | 8 | 2 | Ti/ZrB2(2/1) | 0.5 | — | — | 0.8 | 160 |
| | 89 | 8 | 2 | — | — | Zr/Al2O3(2/1) | 0.5 | 0.8 | 149 |
| | 90 | 8 | 2 | — | — | Zr/Y2O3(3/1) | 0.4 | 0.8 | 127 |
| | 91 | 8 | 2 | — | — | Zr/ZrO2(2/1) | 0.2 | 0.8 | 94 |
| | 92 | 8 | 2 | — | — | Zr/MgO(4/1) | 0.1 | 0.8 | 87 |
| | 93 | 8 | 2 | Zr/TiN(3/1) | 0.35 | — | — | 0.8 | 110 |
| | 94 | 8 | 2 | Zr/TiC(3/1) | 0.2 | — | — | 0.8 | 88 |
| | 95 | 8 | 2 | Zr/TiCN(4/1) | 0.45 | — | — | 0.8 | 138 |
| | 96 | 8 | 2 | Zr/TiB2(3/1) | 0.5 | — | — | 0.8 | 143 |
| | 97 | 8 | 2 | Zr/ZrN(2/1) | 0.2 | — | — | 0.8 | 94 |
| | 98 | 8 | 2 | Zr/ZrC(3/1) | 0.3 | — | — | 0.8 | 109 |
| | 99 | 8 | 2 | Zr/ZrB2(2/1) | 0.4 | — | — | 0.8 | 138 |
| | 100 | 8 | 2 | FeNi/TiN(1/2) | 0.5 | — | — | 0.8 | 58 |
| | 101 | 8 | 2 | FeNi/TiN(1/2) | 3.7 | — | — | 0.8 | 90 |
| | 102 | 8 | 2 | FeAl/TiN(1/2) | 0.5 | — | — | 0.8 | 60 |
| | 103 | 8 | 2 | FeAl/TiN(1/2) | 3.7 | — | — | 0.8 | 96 |
| | 104 | 8 | 2 | FeNi/TiC(1/2) | 0.5 | — | — | 0.8 | 68 |
| | 105 | 8 | 2 | FeNi/TiC(1/2) | 3.7 | — | — | 0.8 | 103 |
| | 106 | 8 | 2 | FeAl/TiC(1/2) | 0.5 | — | — | 0.8 | 70 |
| | 107 | 8 | 2 | FeAl/TiC(1/2) | 3.7 | — | — | 0.8 | 110 |

TABLE II-continued

| | | Cubic sialon (g) | β-Sialon (g) | First and second components Type (mass ratio) | First and second components Content (g) | First and third components Type (mass ratio) | First and third components Content (g) | $\gamma/(\gamma + \alpha)$ | Evaluation results Width of wear Vb (μm) |
|---|---|---|---|---|---|---|---|---|---|
| | 108 | 8 | 2 | FeNi/TiCN(1/2) | 0.5 | — | — | 0.8 | 66 |
| | 109 | 8 | 2 | FeNi/TiCN(1/2) | 3.7 | — | — | 0.8 | 98 |
| | 110 | 8 | 2 | FeAl/TiCN(1/2) | 0.5 | — | — | 0.8 | 70 |
| | 111 | 8 | 2 | FeAl/TiCN(1/2) | 3.7 | — | — | 0.8 | 105 |
| | 112 | 8 | 2 | FeNi/ZrC(1/2) | 0.5 | — | — | 0.8 | 73 |
| | 113 | 8 | 2 | FeNi/ZrC(1/2) | 3.7 | — | — | 0.8 | 112 |
| | 114 | 8 | 2 | FeAl/ZrC(1/2) | 0.5 | — | — | 0.8 | 76 |
| | 115 | 8 | 2 | FeAl/ZrC(1/2) | 3.7 | — | — | 0.8 | 118 |
| | 116 | 8 | 2 | FeNi/ZrB2(1/2) | 0.5 | — | — | 0.8 | 81 |
| | 117 | 8 | 2 | FeNi/ZrB2(1/2) | 3.7 | — | — | 0.8 | 123 |
| | 118 | 8 | 2 | FeAl/ZrB2(1/2) | 0.5 | — | — | 0.8 | 86 |
| | 119 | 8 | 2 | FeAl/ZrB2(1/2) | 3.7 | — | — | 0.8 | 134 |
| | 120 | 8 | 2 | — | — | FeNi/AlB2 (1/2) | 0.1 | 0.8 | 88 |
| | 121 | 8 | 2 | — | — | FeNi/AlB2 (1/2) | 0.5 | 0.8 | 135 |
| | 122 | 8 | 2 | — | — | FeAl/AlB12(2/1) | 0.1 | 0.8 | 93 |
| | 123 | 8 | 2 | — | — | FeAl/AlB12(2/1) | 0.5 | 0.8 | 146 |
| | 124 | 8 | 2 | — | — | FeNi/AlN (2/1) | 0.1 | 0.8 | 66 |
| | 125 | 8 | 2 | — | — | FeNi/AlN (2/1) | 0.5 | 0.8 | 125 |
| | 126 | 8 | 2 | — | — | FeNi/Ti2AlN (1/2) | 0.1 | 0.8 | 54 |
| | 127 | 8 | 2 | — | — | FeNi/Ti2AlN (1/2) | 0.5 | 0.8 | 103 |
| | 126 | 8 | 2 | — | — | FeAl/AlN (2/1) | 0.1 | 0.8 | 72 |
| | 127 | 8 | 2 | — | — | FeAl/AlN (2/1) | 0.5 | 0.8 | 130 |
| | 128 | 8 | 2 | — | — | FeAl/Ti2AlN (1/2) | 0.1 | 0.8 | 62 |
| | 129 | 8 | 2 | — | — | FeAl/Ti2AlN (1/2) | 0.5 | 0.8 | 121 |
| | 130 | 8 | 2 | — | — | FeNi/MgB2 (2/1) | 0.1 | 0.8 | 80 |
| | 131 | 8 | 2 | — | — | FeNi/MgB2 (2/1) | 0.5 | 0.8 | 155 |
| | 132 | 8 | 2 | — | — | FeAl/MgB2 (2/1) | 0.1 | 0.8 | 84 |
| | 133 | 8 | 2 | — | — | FeAl/MgB2 (2/1) | 0.5 | 0.8 | 165 |
| Comp. Ex. | 4 | 10 | 0 | — | — | $Al_2O_3$ | 0.1 | 1 | Fractured |
| | 5 | 10 | 0 | — | — | MgO | 0.2 | 1 | Fractured |
| | 6 | 10 | 0 | — | — | $ZrO_2$ | 0.3 | 1 | Fractured |
| | 7 | 10 | 0 | — | — | $Y_2O_3$ | 0.5 | 1 | Seriously fractured |

Evaluation Results 2

Examples 71 to 77, 82 to 88, and 93 to 99 were cutting tools formed of the sintered compacts produced from the mixtures containing cubic sialon, β-sialon, a first component, and a second component. None of these examples was fractured, and they had a higher fracture resistance and wear resistance than Comparative Examples 4 to 7, which contained no β-sialon.

Examples 67 to 70, 78 to 81, and 89 to 92 were cutting tools formed of the sintered compacts produced from the mixtures containing cubic sialon, β-sialon, a first component, and a third component. None of these examples was fractured, and they had a higher fracture resistance and wear resistance than Comparative Examples 4 to 7, which contained no β-sialon.

Comparative Examples 4 to 7 were cutting tools formed of the sintered compacts produced from the mixtures containing cubic sialon and a third component. All of these comparative examples were fractured.

The embodiments and examples disclosed herein should be construed as illustrative, rather than as limiting, in all respects. The scope of the present invention is defined by the claims, rather than by the foregoing description, and it is intended that all modifications within the meaning and scope of the claims and equivalents thereof be included.

What is claimed is:

1. A sintered compact comprising:
   cubic sialon, β-sialon, and at least one of a first component and a second component, wherein:
   the first component being at least one element selected from the group consisting of iron, cobalt, nickel, and group 4 elements, group 5 elements, and group 6 elements of the periodic table, and
   the second component being at least one compound comprising at least one element selected from the group consisting of group 4 elements, group 5 elements, and group 6 elements and at least one element selected from the group consisting of carbon, nitrogen, and boron.

2. The sintered compact according to claim 1, wherein the mass γ of the cubic sialon and the mass α of the β-sialon in the sintered compact are represented by Inequality 1:

$$0.2 \leq \gamma/(\gamma+\alpha) \leq 0.8 \qquad (1).$$

3. The sintered compact according to claim 1, wherein the total content of the first and second components in the sintered compact is 0.05% to 5% by mass.

4. The sintered compact according to claim 1, further comprising a third component, the third component being at least one compound comprising at least one element selected from the group consisting of oxygen, nitrogen, and boron; and at least one element selected from the group consisting of silicon, magnesium, aluminum, zirconium, and group 3 elements.

5. A cutting tool comprising the sintered compact according to claim 1.

6. A method for manufacturing a sintered compact, comprising the steps of:
preparing cubic sialon;
preparing β-sialon;
preparing at least one of a first component and a second component;
mixing together the cubic sialon, the β-sialon, and the at least one of the first component and the second component to form a mixture; and
sintering the mixture,
the cubic sialon being obtained by subjecting β-sialon to shock compression,
the first component being at least one element selected from the group consisting of iron, cobalt, nickel, and group 4 elements, group 5 elements, and group 6 elements of the periodic table,
the second component being at least one compound comprising at least one element selected from the group consisting of group 4 elements, group 5 elements, and group 6 elements and at least one element selected from the group consisting of carbon, nitrogen, and boron.

7. The method for manufacturing a sintered compact according to claim 6, wherein the mass γ of the cubic sialon and the mass α of the β-sialon in the mixture are represented by Inequality 1:

$$0.2 \leq \gamma/(\gamma+\alpha) \leq 0.8 \tag{1}.$$

8. The method for manufacturing a sintered compact according to claim 6, wherein the total content of the first and second components in the mixture is 0.05% to 5% by mass.

9. The method for manufacturing a sintered compact according to claim 6, wherein a third component is further mixed in the step of forming the mixture, the third component being at least one compound comprising at least one element selected from the group consisting of oxygen, nitrogen, and boron; and at least one element selected from the group consisting of silicon., magnesium, aluminum, zirconium, and group 3 elements.

10. A sintered compact manufactured by the method for manufacturing a sintered compact according to claim 6.

* * * * *